United States Patent
Shih

(10) Patent No.: US 12,235,721 B2
(45) Date of Patent: Feb. 25, 2025

(54) DATA STORAGE DEVICE AND METHOD FOR PERFORMING ERROR RECOVERY

(71) Applicant: Silicon Motion, Inc., Hsinchu County (TW)

(72) Inventor: Fu-Jen Shih, New Taipei (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 18/219,087

(22) Filed: Jul. 6, 2023

(65) Prior Publication Data

US 2024/0202070 A1    Jun. 20, 2024

(30) Foreign Application Priority Data

Dec. 16, 2022 (TW) .................................. 111148373

(51) Int. Cl.
*G06F 11/10* (2006.01)
*G06F 11/07* (2006.01)

(52) U.S. Cl.
CPC ........ *G06F 11/1068* (2013.01); *G06F 11/076* (2013.01)

(58) Field of Classification Search
CPC ............................ G06F 11/1068; G06F 11/076
(Continued)

(56) References Cited

U.S. PATENT DOCUMENTS

| 8,510,592 B1 | 8/2013 | Chan |
| 2005/0132093 A1* | 6/2005 | Yoon .................. G06F 13/1694 710/8 |

(Continued)

FOREIGN PATENT DOCUMENTS

| CN | 106648958 | 11/2019 |
| TW | I755739 B | 2/2022 |

(Continued)

OTHER PUBLICATIONS

"JEDEC Publishes Update to Universal Flash Storage (UFS) Standard." Business Wire, Jan. 30, 2020. ProQuest, https://www.proquest.com/wire-feeds/jedec-publishes-update-universal-flash-storage/docview/2348256423/se-2. (Year: 2020).*

(Continued)

*Primary Examiner* — Shelly A Chase
*Assistant Examiner* — Grace V Braden
(74) *Attorney, Agent, or Firm* — Winston Hsu

(57) ABSTRACT

A data storage device includes at least one signal processing circuit to perform an error recovery procedure when an error has occurred in the data storage device. When performing the error recovery procedure, the signal processing circuit determines which type of line reset is to be performed according to a device identifier. When the device identifier satisfies a predetermined condition, the signal processing circuit performs an operation of periodic line reset to repeatedly transmit a line reset signal to the peer device in a predetermined period until the predetermined period expires or another line reset signal representing an acknowledgment of the line reset signal is received from the peer device; and when the device identifier does not satisfy the predetermined condition, the signal processing circuit performs an operation of one-shot line reset to transmit the line reset signal to the peer device for only one time.

19 Claims, 6 Drawing Sheets

(58) Field of Classification Search
USPC .......................................................... 714/764
See application file for complete search history.

(56) References Cited

U.S. PATENT DOCUMENTS

| | | | | |
|---|---|---|---|---|
| 2005/0216782 | A1* | 9/2005 | Saitoh | G06F 11/0793 |
| | | | | 714/2 |
| 2013/0007562 | A1* | 1/2013 | Fai | G06F 11/1004 |
| | | | | 710/305 |
| 2018/0024962 | A1* | 1/2018 | Lee | G06F 3/0679 |
| | | | | 710/106 |
| 2018/0357067 | A1* | 12/2018 | Mishra | G06F 9/4403 |
| 2021/0200649 | A1 | 7/2021 | Wang | |
| 2021/0303214 | A1* | 9/2021 | Nakano | G06F 3/0604 |

FOREIGN PATENT DOCUMENTS

| | | |
|---|---|---|
| TW | I774145 B | 8/2022 |
| TW | 202240420 A | 10/2022 |
| TW | I783012 B | 11/2022 |

OTHER PUBLICATIONS

Shih, the specification, including the claims, and drawings in the U.S. Appl. No. 18/219,714, filed Jul. 10, 2023.

* cited by examiner

DATA STORAGE DEVICE AND METHOD FOR PERFORMING ERROR RECOVERY

BACKGROUND OF THE INVENTION

1. Field of the Invention

The invention relates to a method for performing error recovery of a data storage device, more particularly to a method for performing error recovery to effectively restore normal operation of the data storage device.

2. Description of the Prior Art

With the rapid growth of data storage technology in recent years, many data storage devices-such as memory cards manufactured in compliance with the Secure Digital (SD)/Multi Media Card (MMC) standards, Compact Flash (CF) standards, Memory Stick (MS) standards or Extreme Digital (XD) standards, as well as solid state hard drives, Embedded Multi Media Cards (eMMC) and Universal Flash Storage (UFS)-have been used widely for a variety of purposes. Therefore, the demand for data storage devices in various fields has also grown significantly. Take the UFS as an example, because UFS provides high transmission speed and high stability, it has been widely used in digital cameras, smart phones, notebook computers, desktop computers and other consumer electronics products.

Generally, in the access operation of the data storage device, if an error has occurred, an error recovery procedure will be triggered to attempt to restore the access operation back to normal. Therefore, how to effectively restore normal operation in the error recovery procedure has become an issue worthy of considering.

In view of this, a method for performing error recovery in the data storage device to effectively restore normal access operation of the data storage device thereby improving the access performance of the data storage device is highly required.

SUMMARY OF THE INVENTION

According to an embodiment of the invention, a data storage device comprises an interface circuit configured to process reception signals received from a peer device and transmission signals to be transmitted to the peer device. The interface circuit comprises a signal processing circuit configured to perform an error recovery procedure when an error has occurred in the data storage device. When performing the error recovery procedure, the signal processing circuit determines to perform an operation of line reset and determines which type of line reset is to be performed according to a device identifier. When the device identifier satisfies a predetermined condition, the signal processing circuit performs an operation of periodic line reset to repeatedly transmit a line reset signal to the peer device in a predetermined period until the predetermined period expires or another line reset signal representing an acknowledgment of the line reset signal is received from the peer device. When the device identifier does not satisfy the predetermined condition, the signal processing circuit performs an operation of one-shot line reset to transmit the line reset signal to the peer device for only one time.

According to an embodiment of the invention, a method for performing error recovery, applied in an error recovery procedure performed by a signal processing circuit when an error has occurred in a data storage device, comprises: transmitting a first predetermined request signal to a peer device to try to trigger a first signal handshake procedure; determining which type of line reset is to be performed according to a device identifier when determining that the first signal handshake procedure has failed; performing an operation of periodic line reset to repeatedly transmit a line reset signal to the peer device when the device identifier satisfies a predetermined condition; and performing an operation of one-shot line reset to transmit the line reset signal to the peer device for only one time when the device identifier does not satisfy the predetermined condition.

These and other objectives of the present invention will no doubt become obvious to those of ordinary skill in the art after reading the following detailed description of the preferred embodiment that is illustrated in the various figures and drawings.

DETAILED DESCRIPTION

In the following, numerous specific details are described to provide a thorough understanding of embodiments of the invention. However, one of skilled in the art will understand how to implement the invention in the absence of one or more specific details, or relying on other methods, elements or materials. In other instances, well-known structures, materials or operations are not shown or described in detail in order to avoid obscuring the main concepts of the invention.

Reference throughout this specification to "one embodiment", "an embodiment", "one example" or "an example" means that a particular feature, structure or characteristic described in connection with the embodiment or example is included in at least one embodiment of a plurality of embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

In addition, in order to make the objects, features and advantages of the invention more comprehensible, specific embodiments of the invention are set forth in the accompanying drawings. This description is made for the purpose of illustrating the general principles of the invention and should not be taken in a limiting sense. It should be understood that the following embodiments can be implemented by software, hardware, firmware, or any combination thereof.

Figure 1:
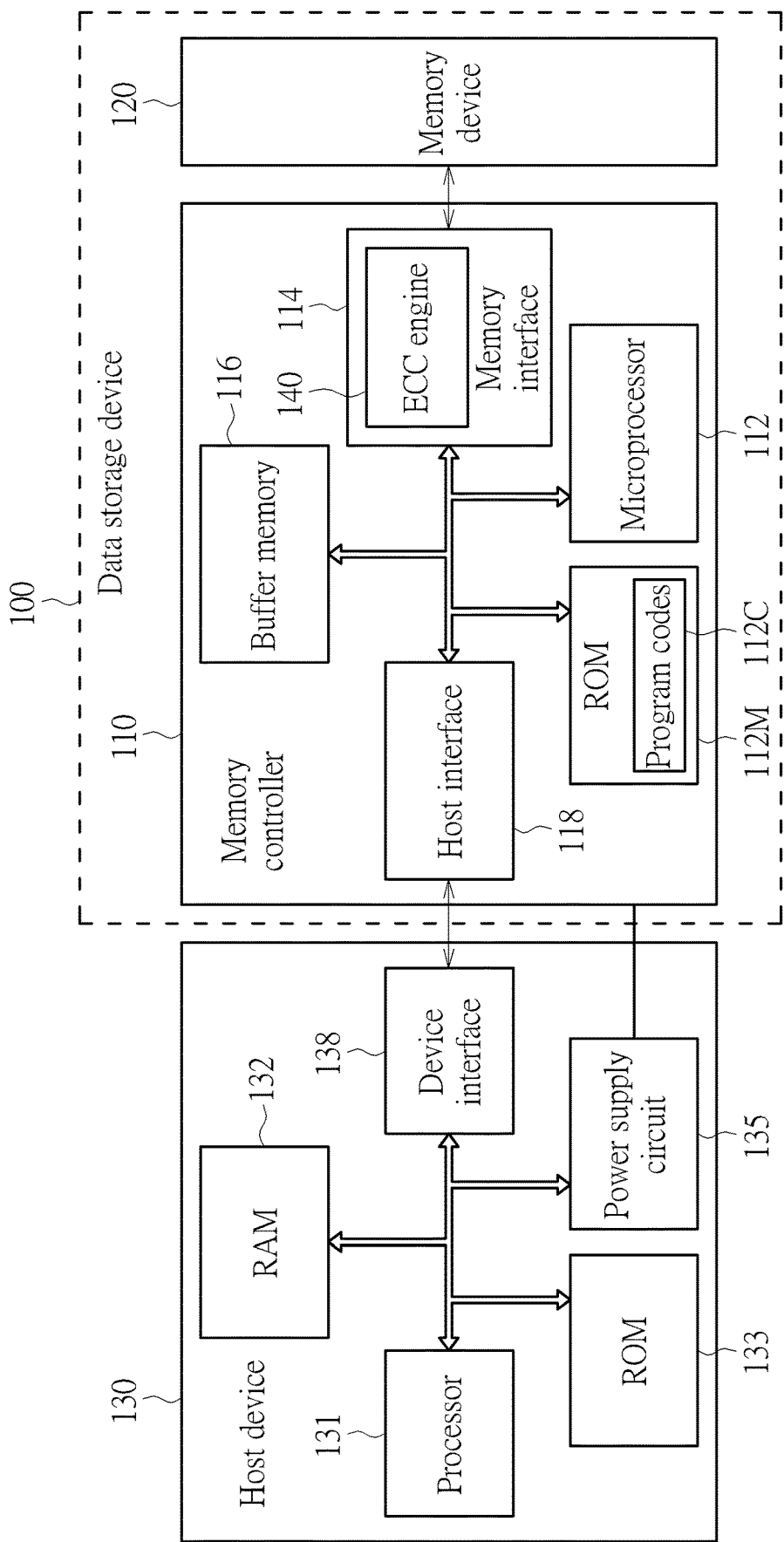
FIG. 1 shows an exemplary block diagram of a data storage system according to an embodiment of the invention.

FIG. 1 shows an exemplary block diagram of a data storage system according to an embodiment of the invention. The data storage system may comprise a host device 130 and a data storage device 100. The host device 130 may comprise at least one processor 131, at least one random access memory (RAM) 132, such as at least one dynamic RAM (DRAM), at least one static RAM (SRAM), . . . etc. (not shown in FIG. 1), at least one Read Only Memory (ROM) 133, a power supply circuit 135, and a device interface 138.

The host device 130 accesses the data storage device 100 through the device interface 138. The processor 131, the device interface 138, the RAM 132 and the ROM 133 may be coupled to each other through a bus, and may be coupled to the power supply circuit 135 to obtain power. The processor 131 may be arranged to control operations of the host device 130. The ROM 133 is configured to store program codes. The processor 131 is configured to execute the program codes, thereby controlling operations to the host device 130.

The power supply circuit 135 may be arranged to provide the processor 131, the device interface 138, the RAM 132 and ROM 133 with power as well as provide the data storage device 100 with power through the bus or the power lines. For example, the power supply circuit 135 may output one or more driving voltages to the data storage device 100. The data storage device 100 may obtain the one or more driving voltages from the host device 130 as the power of the data storage device 100 and provide the host device 130 with storage space.

The data storage device 100 may comprise a memory device 120 and a memory controller 110. The memory controller 110 is configured to access the memory device 120 and control operations of the memory device 120. The memory device 120 may be a non-volatile (NV) memory (e.g., a Flash memory) device and may comprise one or more memory elements (e.g., one or more Flash memory dies, or one or more Flash memory chip, or the likes).

According to an embodiment of the invention, the host device 130 may issue commands, such as the read command or the write command, to the data storage device 100, so as to access the data stored in the memory device 120, or the host device 130 may issue commands to further control or manage the data storage device 100.

According to an embodiment of the invention, the memory controller 110 may comprise a microprocessor 112, a ROM 112M, a memory interface 114, a buffer memory 116 and a host interface 118. The ROM 112M is configured to store program codes 112C. The microprocessor 112 is configured to execute the program codes 112C, thereby controlling access to the memory device 120. The program codes 112C may comprise one or more program modules, such as the boot loader code. When the data storage device 100 obtains power from the host device 130, the microprocessor 112 may perform an initialization procedure of the data storage device 100 by executing the program codes 112C. In the initialization procedure, the microprocessor 112 may load a group of In-System Programming (ISP) codes (not shown in FIG. 1) from the memory device 120. The microprocessor 112 may execute the group of ISP codes, so that the data storage device 100 has various functions. According to an embodiment of the invention, the group of ISP codes may comprise, but are not limited to: one or more program modules related to memory access (e.g., read, write and erase), such as a read operation module, a table lookup module, a wear leveling module, a read refresh module, a read reclaim module, a garbage collection module, a sudden power off recovery (SPOR) module and an uncorrectable error correction code (UECC) module, respectively provided for performing the operations of read, table lookup, wear leveling, read refresh, read reclaim, garbage collection, SPOR and error handling for detected UECC error.

The memory interface 114 may comprise an error correction code (ECC) engine 140. The ECC engine 140 may comprise a data buffer (not shown in FIG. 1) for buffering data to assist the ECC engine 140 in performing the encoding and decoding on the data. In the write procedure to write data into the memory device 120, the ECC engine 140 is configured to encode the data to be written into the memory device 120, such as performing the ECC encoding, so as to generate extra parity bits. In the read procedure to read data from the memory device 120, the ECC engine 140 is configured to decode the data read from the memory device 120 to detect the error bit(s) in the data and correct the value(s) of the error bit(s) when the error is correctable (e.g., the number of error bits does not exceed the maximum number of error bits that can be corrected by the ECC engine 140).

Typically, the memory device 120 may comprise a plurality of memory elements, such as a plurality of Flash memory dies or Flash memory chips, and each memory element may comprise a plurality of memory blocks. The access unit of an erase operation performed by the memory controller 110 on the memory device 120 may be one memory block. In addition, a memory block may record (comprise) a predetermined number of pages, for example, the physical pages, and the access unit of a write operation performed by the memory controller 110 on the memory device 120 may be one page.

In practice, the memory controller 110 may perform various control operations by using its own internal components. For example, the memory controller 110 may use the memory interface 114 to control the access operations (especially the access operation for at least a memory block or at least a page) of the memory device 120, use the buffer memory 116 to perform necessary data buffer operations, and use the host interface 118 to communicate with the host device 130.

In an embodiment of the invention, the memory controller 110 may use the host interface 118 to communicate with the host device 130 in compliance with a standard communication protocol. Similarly, the host device 130 may use the device interface 138 to communicate with the memory controller 110 in compliance with the same standard communication protocol.

For example, the standard communication protocol may comprise (but is not limited to) the Universal Serial Bus (USB) standard, the SD interface standard, the Ultra High Speed-I (UHS-I) interface standard, the Ultra High Speed-II (UHS-II) interface standard, the CF interface standard, the Multi Media Card (MMC) interface standard, the eMMC interface standard, the UFS interface standard, the Advanced Technology Attachment (ATA) standard, the Serial ATA (SATA) standard, the Peripheral Component Interconnect Express (PCI-E) standard, the Parallel Advanced Technology Attachment (PATA) standard, etc.

In an embodiment, the buffer memory 116 may be implemented by a RAM. For example, the buffer memory 116 may be an SRAM, but the invention should not be limited thereto. In other embodiments, the buffer memory 116 may be a DRAM.

In an embodiment of the invention, the data storage device 100 may be a portable storage device (for example, the memory card in compliance with the SD/MMC, CF, MS and/or XD standard), and the host device 130 may be an electronic device, such as a mobile phone, a notebook computer, a desktop computer . . . etc., capable of connecting to the data storage device. The host device 130 combined with the data storage device 100 as a whole may be a data storage system or a data storage system in an electronic device system. In another embodiment of the invention, the data storage device 100 may be a solid state hard disk or an embedded storage device in compliance with the UFS or the eMMC standards, and may be equipped in an electronic device such as a mobile phone, a notebook computer, or a desktop computer. In such an embodiment, the host device 130 may be the electronic device comprising the data storage device 100 and the host device 130 combined with the data storage device 100 as a whole may also be a data storage system.

According to an embodiment of the invention, the host interface 118 and the device interface 138 may have a symmetric signal processing architecture, so as to process the signals to be transmitted and/or to be received as well as to implement high speed data transmission between the data storage device 100 and the host device 130.

Figure 2:
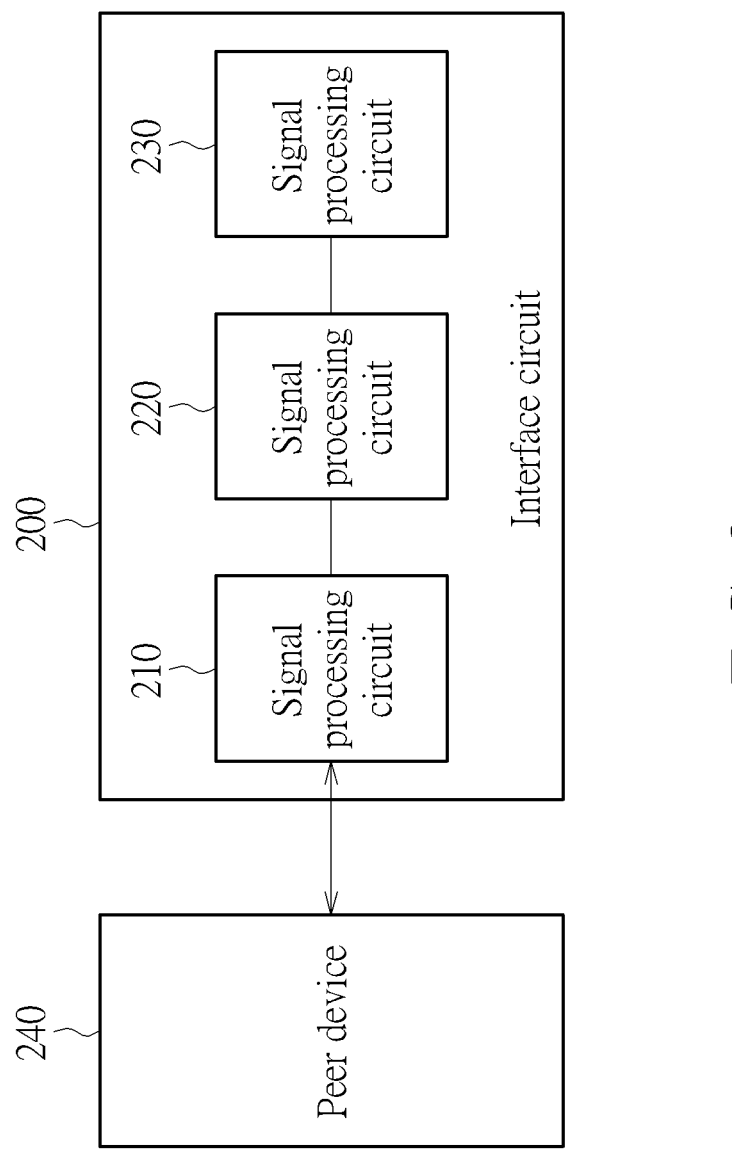
FIG. 2 is an exemplary block diagram of an interface circuit according to an embodiment of the invention.

FIG. 2 is an exemplary block diagram of an interface circuit according to an embodiment of the invention. According to an embodiment of the invention, the interface circuit 200 may be a host interface or a device interface configured in a predetermined device (as an example, the aforementioned data storage device or host device), for the predetermined device and another peer device (as an example, the aforementioned host device or data storage device) to communicate with each other through the interface circuit 200 and transmit data signal and control signal therethrough. According to an embodiment of the invention, the interface circuit 200 may be the host interface 118 configured inside the memory controller 110 or the device interface 138 configured inside the host device 130 as shown in FIG. 1. It is to be noted that in the embodiments of the invention, since the host interface 118 and the device interface 138 which are designed to be connected together have a symmetric signal processing architecture, the interface circuit 200 shown in FIG. 2 may represent or illustrate the signal processing architecture of both the host interface and the device interface, and when the interface circuit 200 is implemented as the host interface and the device interface, the circuits comprised therein and the corresponding operations may be the same or substantially the same in both implementations, and may have a symmetrical operation logic. Therefore, the following description is not limited to any of the host interface and the device interface, and can be considered as one specific implementation of either the host interface or the device interface, or both.

The interface circuit 200 may comprise signal processing circuits 210, 220 and 230 that operate in compliance with different layer communication protocols. The signal processing circuit 210 may be the physical layer signal processing circuit to process reception signals received from the peer device 240 and the transmission signals to be transmitted to the peer device 240 in compliance with physical layer communication protocol. As an example, the signal processing circuit 210 may perform physical layer operations, such as amplification or attenuation, analog-to-digital or digital-to-analog conversion, frequency mixing, basic encoding or decoding, and unpacking of physical layer packet, on the reception signals and transmission signals. As described above, when the interface circuit 200 is implemented as a host interface, the peer device 240 may be the host device or the device interface in the host device. When the interface circuit 200 is implemented as a device interface, the peer device 240 may be the data storage device or the host interface in the data storage device.

The signal processing circuit 220 may be the protocol layer signal processing circuit configured to perform corresponding signal processing on reception signals and the transmission signals in compliance with another layer communication protocol above the physical layer. As an example, the signal processing circuit 220 may perform signal processing on the reception signals and the transmission signals in compliance with the Unified Protocol (UniPro) developed by the Mobile Industry Processor Interface (MIPI) alliance. The signal processing circuit 220 may comprise multiple layers of signal processing circuits, for example, a physical adapter (PA) layer signal processing circuit which is coupled to the physical layer signal processing circuit, and other layers of signal processing circuits. The signal processing circuit 230 may be the application layer signal processing circuit configured to perform higher layer signal processing in compliance with the application layer protocol.

In the embodiments of the invention, when an error, such as an access error or access failure, has occurred in the data storage device 100, the signal processing circuit 220 may start to perform an error recovery procedure in response to a notification from the upper layer, to try to restore normal access operation of the data storage device 100. Here, the mentioned upper layer may be the signal processing circuit 230 shown in FIG. 2, or the microprocessor 112 or the processor 131 shown in FIG. 1. Since not only the error in the data storage device 100 may cause the access error or access failure, the error in the host device 130 may also cause the access error or access failure to occur in the data storage device 100, in the embodiments of the invention, the signal processing circuit 220 implementing the proposed method for performing error recovery may be not only the signal processing circuit comprised in the host device 118, but also the signal processing circuit comprised in the device interface 138.

Generally, when an error has occurred in the data storage system or the data storage device 100, the error recovery procedure will be triggered to try to restore normal access operation of the data storage device 100. If the access operation of the data storage device 100 cannot be restored via the error recovery procedure, it may be determined that a fatal error has occurred. Once the fatal error is determined to have occurred, the data storage system or at least one of the host device 130 and the data storage device 100 in the data storage system has to be powered off or reset, causing greatly inconvenience to the user. To restore normal access operation of the data storage device 100 in the error recovery procedure more efficiently so as to avoid the determination or the occurrence of the fatal error and to further improve the access performance of the data storage device 100, a method for performing error recovery is provided, and the proposed method may be performed by a signal processing circuit (e.g., the signal processing circuit 220 as shown in FIG. 2) comprised in the interface circuit (e.g., the interface circuit 200 as shown in FIG. 2) of at least one of the host device 130 and the data storage device 100 in the data storage system.

Figure 3:
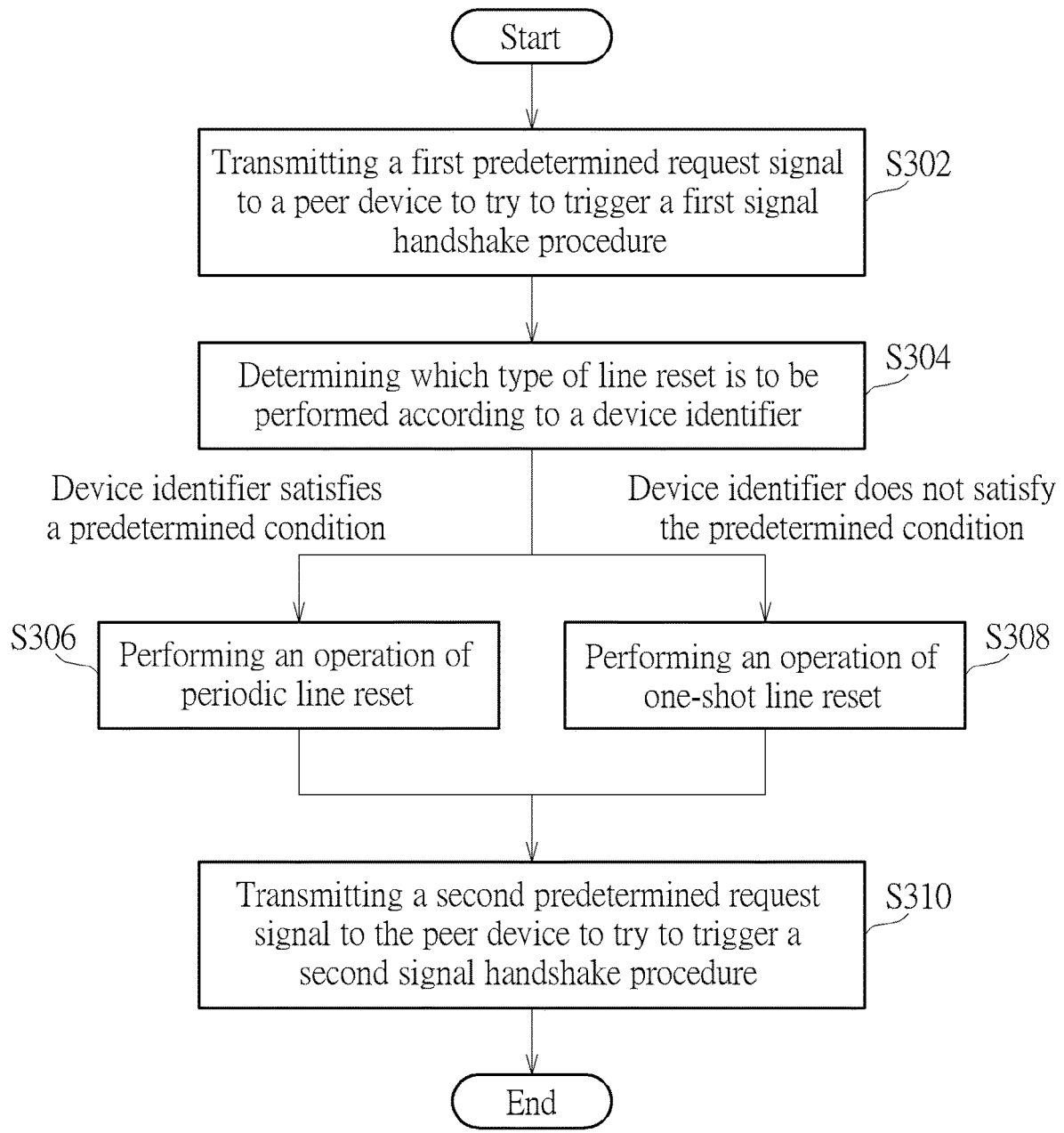
FIG. 3 is an exemplary flowchart of a method for performing error recovery according to an embodiment of the invention.

FIG. 3 is an exemplary flowchart of a method for performing error recovery according to an embodiment of the invention. FIG. 3 is a simplified flow chart to illustrate the concept of the invention, and the signal processing circuit 220 will be utilized in the following paragraphs as a representative device performing the proposed method.

Step S302: transmitting a first predetermined request signal to a peer device (e.g., the peer device 240) to try to trigger a first signal handshake procedure. In an embodiment of the invention, when the signal processing circuit 220 determines that the first signal handshake procedure is successful, the signal processing circuit 220 may directly determine that the error recovery is successful and the error recovery procedure may be ended. In another embodiment of the invention, when the first signal handshake procedure is successful, the signal processing circuit 220 may perform step S302 for at least one more time, to increase the reliability of determining that error recovery is successful by performing the first signal handshake procedure for multiple times.

On the other hand, when the signal processing circuit 220 determines that the first signal handshake procedure has failed, step S304 is performed. Similarly, when the signal processing circuit 220 determines that the first signal handshake procedure has failed in any repeatedly performed step S302, the signal processing circuit 220 may further perform step S304.

Step S304: determining which type of line reset is to be performed according to a device identifier. The device identifier may be a device identifier corresponding to the device comprising the signal processing circuit 220. To be more specific, the signal processing circuit 220 may determine whether the device identifier satisfies a predetermined condition. When the device identifier satisfies the predetermined condition, step S306 is performed. When the device identifier does not satisfy the predetermined condition, step S308 is performed.

According to an embodiment of the invention, the predetermined condition may be, for example but not limited to, a value of the device identifier being lower than, equal to, or higher than a predetermined value, or a value of the device identifier corresponding to the local device being higher than a value of the device identifier corresponding to the peer device, or others.

Step S306: performing an operation of periodic line reset to repeatedly transmit a line reset signal to the peer device within a predetermined period. In an embodiment of the invention, when determining that the line reset signal transmitted in step S306 has not been received by the peer device, the signal processing circuit 220 may directly determine that error recovery has failed and the error recovery procedure may be ended. In another embodiment of the invention, when determining that the line reset signal transmitted in step S306 has not been received by the peer device, the signal processing circuit 220 may continue to perform step S310.

Step S308: Performing an operation of one-shot line reset to transmit the line reset signal to the peer device for only one time. In an embodiment of the invention, when determining that the line reset signal transmitted in step S308 has not been received by the peer device, the signal processing circuit 220 may directly determine that error recovery has failed and the error recovery procedure may be ended. In another embodiment of the invention, after the line reset signal has been transmitted to the peer device in step S308, the signal processing circuit 220 may continue to perform step S310, directly.

Step S310: transmitting a second predetermined request signal to the peer device to try to trigger a second signal handshake procedure. In an embodiment of the invention, when the signal processing circuit 220 determines that the second signal handshake procedure is successful, the signal processing circuit 220 may directly determine that the error recovery is successful and the error recovery procedure may be ended. When the signal processing circuit 220 determines that the second signal handshake procedure has failed, the signal processing circuit 220 may determine that the error recovery has failed and the error recovery procedure may be ended. In an embodiment of the invention, when determining that the error recovery has failed, since the signal processing circuit 220 is unable to restore normal access operation of the data storage device 100 through the error recovery procedure, the signal processing circuit 220 or the interface circuit 200 comprising the signal processing circuit 220 may determine that fatal error has occurred in the data storage device or the data storage system, and may further trigger the corresponding repairing procedure, for example but not limited to, powering off and then powering on (for example, rebooting) the device, or resetting the device.

According to an embodiment of the invention, the first predetermined request signal and the second predetermined request signal may both be a power mode change request signal defined by the Mobile Industry Processor Interface (MIPI) alliance, such as the power mode change request signal PACP_PWR_REQ specifically defined in the standards or the specification that the data storage device 100 and the host device 130 operate in compliance with.

Figure 4:
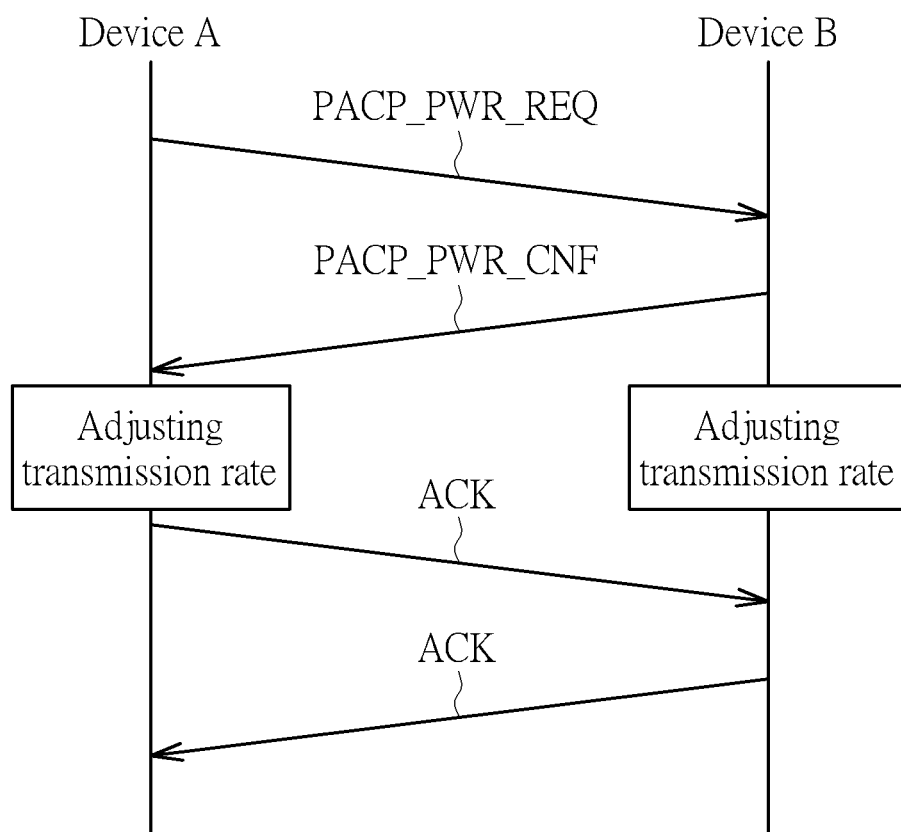
FIG. 4 shows an exemplary message flow of the signal handshake procedure triggered by the power mode change request signal according to an embodiment of the invention.

FIG. 4 shows an exemplary message flow of the signal handshake procedure triggered by the power mode change request signal according to an embodiment of the invention. The message flow shown in FIG. 4 may comprise operations of transmitting multiple communication signals between two devices (e.g., the Device A and Device B shown in FIG. 4), where the Device A may be one of the host device 130 and the data storage device 100 and the Device B may be another of the host device 130 and the data storage device 100.

Device A may transmit a power mode change request signal PACP_PWR_REQ to Device B, where the power mode change request signal PACP_PWR_REQ may carry a transmission rate requested by Device A. In response to reception of the power mode change request signal PACP_PWR_REQ, Device B may replay to Device A with a power mode change confirm signal PACP_PWR_CNF. Generally, Device A and Device B get the information regarding the transmission rates supported by each other during the initialization phase of establishing the connection between the two parties. Therefore, the transmission rate requested by Device A will be the transmission rate supported by both Device A and Device B.

After transmitting the power mode change confirm signal PACP_PWR_CNF, Device B may accordingly adjust the transmission rate to set the current transmission rate to the one requested by Device A. After receiving the power mode change confirm signal PACP_PWR_CNF, Device A may accordingly adjust the transmission rate to set the current transmission rate to the one requested by itself. Then, Device A and Device B may respectively transmit the Acknowledgment (ACK) signal to each other to end the signal handshake procedure.

In the embodiments of the invention, if all the messages transmitted in the signal handshake procedure are successfully transmitted and are successfully received by the peer device, the signal handshake procedure is determined successful. On the contrary, when any message transmitted in the signal handshake procedure is unable to be successfully transmitted or successfully received by the peer device, the signal handshake procedure is determined to have failed.

According to an embodiment of the invention, in the first signal handshake procedure in step S302, the signal processing circuit of the requesting party (for example, Device A) may request to reset a current transmission rate. As an example, the requesting party may request to maintain the current transmission rate at a predetermined transmission rate that is being used by the data storage device or the data storage system when the error occurred. In other words, in the first signal handshake procedure in step S302, the transmission rate requested by the requesting party to be set may be the current transmission rate. Since the data storage system and/or the data storage device do not adjust the transmission rate after the error has occurred in the data storage system and/or the data storage device, the current transmission rate of the requesting party is the aforementioned predetermined transmission rate that is being used by the data storage device or the data storage system when the error occurred.

According to another embodiment of the invention, when step S302 is repeatedly performed, the signal processing circuit of the requesting party (for example, Device A) may also set the requested transmission rate to another transmission rate lower than the current transmission rate (for the scenario when the current transmission rate is not the lowest transmission rate supported by the data storage system). Therefore, the invention is not limited to the embodiment of maintaining the current transmission rate at the predetermined transmission rate that is being used by the data storage device or the data storage system when the error occurred in the first signal handshake procedure.

In addition, according to an embodiment of the invention, in the second signal handshake procedure in step S310, the requesting party (for example, Device A) may request to reset the current transmission rate. For example, the requesting party may request to set the current transmission rate back to the predetermined transmission rate that is being used by the data storage device or the data storage system when the error occurred.

According to an embodiment of the invention, the transmission rate may be a bi-directional transmission rate, i.e., may comprise a transmission rate at which data is transmitted to a peer device and a reception rate at which data is received from the peer device. For example, the power mode change request signal PACP_PWR_REQ may at least comprise a transmission rate setting field TXGear for setting the transmission rate and a reception rate setting field RXGear for setting the reception rate.

In addition, according to an embodiment of the invention, the power mode change request signal PACP_PWR_REQ and/or the power mode change confirm signal PACP_PWR_CNF may comprise at least one field to carry information regarding the device identifier corresponding to the transmitting party. It is to be noted that, in the embodiments of the invention, the information regarding the device identifier may also be exchanged during the aforementioned initialization phase of establishing the connection between the two parties. Therefore, the signal processing circuit 220 (or, other circuit comprised in the corresponding device) may record the information regarding the device identifiers respectively corresponding to the local device and the peer device.

According to an embodiment of the invention, there may be multiple signal transmission lanes between the host device 130 and the data storage device 100. As an example, there may be at least a transmission (TX) lane and a reception (RX) lane between the host device 130 and the data storage device 100. One terminal of each lane may be connected to a transmission port or a transmission pad of the host device 130 (or the data storage device 100) and another terminal thereof may be connected to a reception port or a reception pad of the data storage device 100 (or the host device 130).

In addition, each lane may further comprise one or more signal transmission paths, such as the signal transmission paths implemented by signal lines, transmission lines, traces, or the likes. In the implementation of using single-ended signal transmission between the host device 130 and the data storage device 100, each lane may comprise at least one signal transmission path, and in the implementation of using differential signal transmission between the host device 130 and the data storage device 100, each lane may comprise at least two signal transmission paths respectively configured to transmit the positive signal (P) and the negative signal (N). In an embodiment of the invention, the line reset signal may be transmitted by setting voltages on a pair of differential signal transmission paths of at least one lane based on a specific pattern. For example, the specific pattern may be that {P: high level, N: low level, time interval: 1 ms}.

To be more specific, according to an embodiment of the invention, the host device 130 or the data storage device 100 may respectively set the voltage levels on the signal transmission paths for transmitting the positive signal and the negative signal at different levels, and maintain this setting for at least a predetermined time interval, thereby sending out the line reset signal for the peer device to easily identify or detect the line reset signal.

Taking the aforementioned specific pattern {P: high level, N: low level, time interval: 1 ms} as an example, the transmitting party (for example, one of the host device 130 and the data storage device 100) may set the voltage level on the signal transmission path for transmitting the positive signal (P) at a high level, such as 300 mv, set the voltage level on the signal transmission path for transmitting the negative signal (N) at a low level, such as 0 mv or the ground level, and maintain this setting for at least 1 ms to transmit the line reset signal via such setting. In this manner, the operation of Line Reset is implemented, and such operation is performed for the receiving party (for example, another of the host device 130 and the data storage device 100) to easily identify or detect that this lane is currently set to a Line Reset status.

When the receiving party receives the line reset signal (or, detects or notices that this lane is currently set to the Line Reset status), the receiving party transmits another line reset signal to the transmitting party to represent an acknowledgment of that the line reset signal transmitted by the transmitting party has been received by the receiving party. In addition, in response to the reception of the line reset signal, the receiving party of the line reset signal must reduce the current transmission rate to the lowest transmission rate supported in the data storage system. That is, the lowest transmission rate supported by both the host device 130 and the data storage device in the data storage system. Therefore, in the embodiments of the invention, in the second signal handshake procedure in step S310, the signal processing circuit may further request to set the current transmission rate back to the predetermined transmission rate that is being used by the data storage device or the data storage system when the error occurred.

Figure 5:
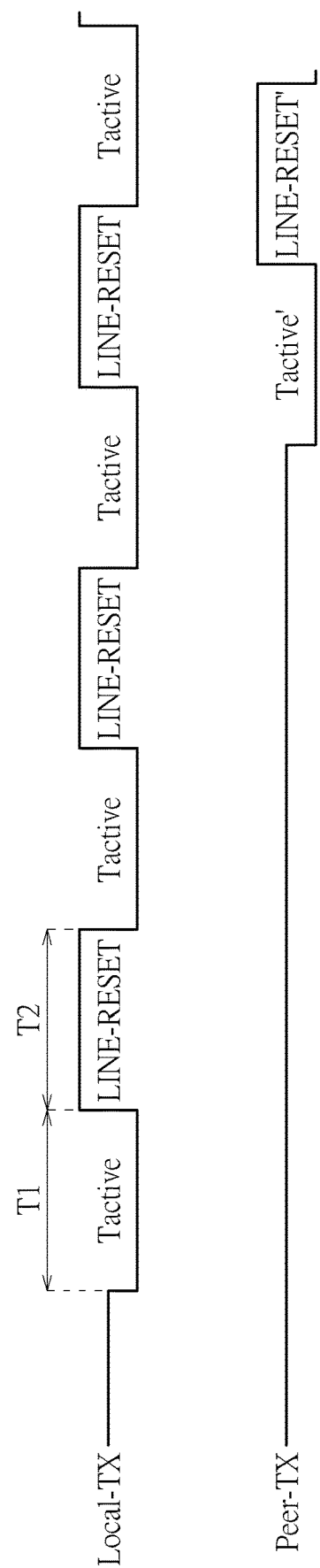
FIG. 5 is a schematic diagram showing the operation of the proposed periodic line reset according to an embodiment of the invention.

FIG. 5 is a schematic diagram showing the operation of the proposed periodic line reset according to an embodiment of the invention. The upper portion of FIG. 5 shows the voltage difference between the two signal transmission paths corresponding to the positive and negative signals (e.g., the P and N) of the local transmission port (labeled as Local-TX), and the lower portion shows the voltage difference between the two signal transmission paths corresponding to the positive and negative signals (e.g., the P and N) of the transmission port at the peer device (marked as Peer-TX), thereby illustrating the periodic line reset operation performed by the local device and the operation of replying another line reset signal performed by the peer device in response to the reception of at least one line reset signal.

As shown in FIG. 5, in the time interval Tactive, the local device (that is, the device performing the operation of the periodic line reset) may set the voltage on the signal transmission path for transmitting the negative signal (N) to a high level, and set the voltage on the signal transmission path for transmitting the positive signal (P) to a low level, and maintain this setting for at least a length of time T1. In the time interval LINE-RESET, the local device may set the voltage on the signal transmission path for transmitting the positive signal to a high level, and set the voltage on the signal transmission path used for transmitting the negative signal to a low level, and maintain this setting for at least a length of time T2. The local device may repeatedly set the voltages on the differential signal transmission paths based on this pattern to implement the operation of periodic line reset.

In response to reception of at least one line reset signal, the peer device may also set the levels of the voltages on the differential signal transmission paths based on the specific pattern in the time interval Tactive' and the time interval LINE-RESET' to notify the local device of the acknowledgement of the line reset signal.

According to an embodiment of the invention, the signal processing circuit 220 may perform the operation of periodic line reset within a predetermined period. That is, before the predetermined period expires, the signal processing circuit 220 may repeatedly transmit the line reset signal to the peer device. In the embodiments of the invention, the predetermined period may be defined by a length of time or by the number of times the line reset operation has to be performed. For example, the operation of setting the voltage in a time interval Tactive and the operation of setting the voltage in a time interval LINE-RESET as shown in FIG. 5 may be defined as one line reset operation. Therefore, in the embodiment shown in FIG. 5, the local device has performed the line reset operation for three times. Similarly, in the embodiment shown in FIG. 5, the peer device has performed the line reset operation once. The signal processing circuit 220 may determine that the predetermined period expires when the length of time of repeatedly transmitting the line reset signal to the peer device reaches a predefined length of time or when the number of times that the line reset operation has been performed reaches a predefined number of times.

In addition, according to an embodiment of the invention, besides the expiration of the predetermined period, the stop condition of performing the periodic line reset may also comprise reception of another line reset signal from the peer device. That is, the signal processing circuit 220 may interrupt or stop the periodic line reset operation when determining that the predetermined period expires or when another line reset signal, which represents an acknowledgment of the transmitted line reset signal, has been received from the peer device. Reception of said another line reset signal means that the periodic line reset is successful, and the signal processing circuit 220 may continue the error recovery procedure, as an example, continue to perform the step S310 illustrated in FIG. 3. If the signal processing circuit 220 has not received any line reset signal from the peer device when the predetermined period expires, the signal processing circuit 220 may determine that the error recovery has failed.

It should be noted that those skilled in the art is capable of understanding and deducing the way to implement the operation of one-shot line reset from the operation of periodic line reset shown in FIG. 5, thus repeated descriptions are omitted here for brevity.

Figure 6:
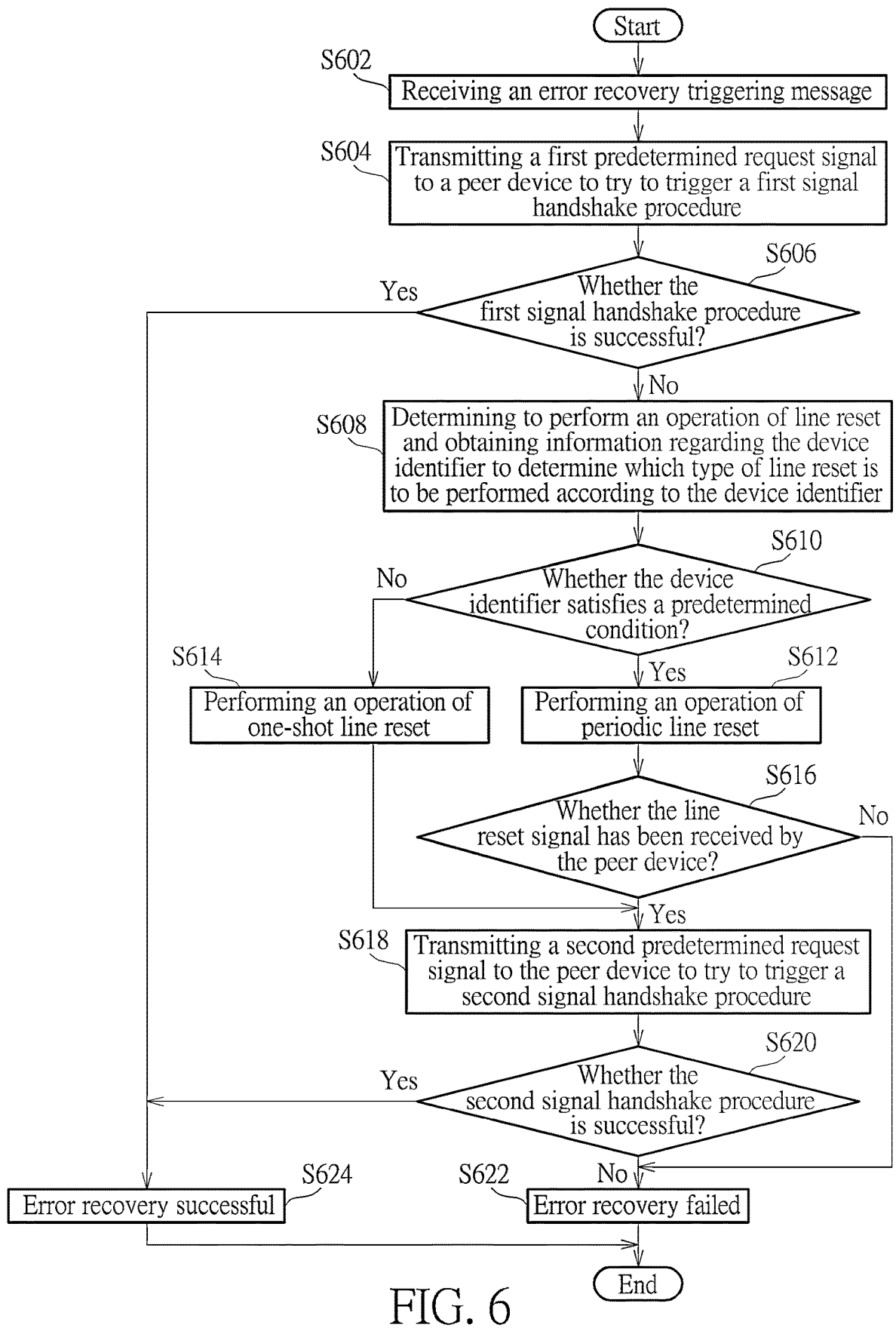
FIG. 6 is an exemplary flowchart of a method for performing error recovery according to another embodiment of the invention.

FIG. 6 is an exemplary flowchart of a method for performing error recovery according to another embodiment of the invention. FIG. 6 is a more detailed flow chart, and the signal processing circuit 220 will be utilized in the following paragraphs as a representative device performing the proposed method.

Step S602: Receiving an error recovery triggering message to trigger the signal processing circuit 220 to start performing the error recovery procedure. According to an embodiment of the invention, the error recovery triggering message may be a physical adapter (PA) initialization request message PA_INIT_REQ defined by the MIPI alliance.

Step S604: transmitting a first predetermined request signal to a peer device (e.g., the peer device 240) to try to trigger a first signal handshake procedure.

Step S606: determining whether the first signal handshake procedure is successful. According to an embodiment of the invention, when the first signal handshake procedure is determined successful, the signal processing circuit 220 may directly determine that error recovery is successful (step S624) and the error recovery procedure may be ended. When the first signal handshake procedure is determined to have failed, step S608 is performed. Note that as described above, in another embodiment of the invention, when the first signal handshake procedure is determined successful, the signal processing circuit 220 may repeatedly perform step S604 for at least one more time, to increase the reliability of determining that error recovery is successful by performing the first signal handshake procedure for multiple times.

In addition, in the first signal handshake procedure, the requesting party may set the requested transmission rate as the current transmission rate, that is, the predetermined transmission rate that is being used by the data storage device or the data storage system when the error occurred. In the embodiment of performing the first signal handshake procedure for multiple times, the requesting party may also set the requested transmission rate as another transmission rate lower than the current transmission rate. Therefore, the invention is not limited to the embodiment of maintaining the current transmission rate at the predetermined transmission rate that is being used by the data storage device or the data storage system when the error occurred in the first signal handshake procedure.

Step S608: determining to perform an operation of line reset and obtaining information regarding the device identifier to determine which type of line reset is to be performed according to the device identifier.

Step S610: determining whether the device identifier satisfies a predetermined condition. If the determination result shows yes, step S612 is performed. If the determination result shows no, step S614 is performed.

Step S612: performing an operation of periodic line reset to repeatedly transmit a line reset signal to the peer device within a predetermined period.

Step S614: performing an operation of one-shot line reset to transmit the line reset signal to the peer device for only one time Step S616: determining whether the line reset signal has been received by the peer device. For example, determining whether another line reset signal is received from the peer device during the performance of the periodic line reset operation. If it is determined that any line reset signal has been received by the peer device, step S618 is performed. If it is determined that none of the line reset signals transmitted in the operation of periodic line reset has been received by the peer device, error recovery fail may be directly determined (step S622) and the error recovery procedure may be ended. Note that in an embodiment of the invention, when determining that the line reset signals have not been received by the peer device, the signal processing circuit 220 may still perform step S618.

Step S618: transmitting a second predetermined request signal to the peer device to try to trigger a second signal handshake procedure.

It is to be noted that, in an embodiment of the invention, after performing the operation of one-shot line reset in step S614, the signal processing circuit may directly perform step S618 to trigger the second signal handshake procedure by transmitting the second predetermined request signal to the peer device. However, in another embodiment of the invention, after performing the operation of one-shot line reset in step S614, the signal processing circuit may also continue to perform step S616 to determine whether the line reset signal transmitted in the one-shot line reset operation has been received by the peer device.

In addition, as described above, in response to the reception of the line reset signal, the receiving party of the line reset signal must reduce the current transmission rate to the lowest transmission rate supported in the data storage system. That is, the lowest transmission rate supported by both the host device 130 and the data storage device in the data storage system. Therefore, in the embodiments of the invention, the second predetermined request signal is transmitted at a current transmission rate which is set to the lowest transmission rate, and in the second signal handshake procedure, the signal processing circuit 220 may further request to set the current transmission rate back to the predetermined transmission rate that is being used by the data storage device or the data storage system when the error occurred via the second predetermined request signal. For example, the signal processing circuit 220 may set the values corresponding to the transmission rate setting field and the reception rate setting field of the second predetermined request signal to the transmission rate and the reception rate that is being used by the data storage device or the data storage system when the error occurred.

Step S620: determining whether the second signal handshake procedure is successful. In an embodiment of the invention, when the signal processing circuit 220 determines that the second signal handshake procedure is successful, the signal processing circuit 220 may directly determine that the error recovery is successful (Step S624) since the current transmission rate is successfully restored to the predetermined transmission rate that is being used by the data storage device or the data storage system when the error occurred, and the error recovery procedure may be ended. When the signal processing circuit 220 determines that the second signal handshake procedure has failed, since the current transmission rate is unable to be successfully restored to the predetermined transmission rate that is being used by the data storage device or the data storage system when the error occurred, the signal processing circuit 220 may determine that the error recovery has failed (Step S622) and the error recovery procedure may be ended.

Step S622: Error recovery failed. In an embodiment of the invention, when it is determined that error recovery has failed, since the signal processing circuit 220 is unable to restore normal access operation of the data storage device 100 via the error recovery procedure, the signal processing circuit 220 or the interface circuit 200 comprising the signal processing circuit 220 may determine that fatal error has occurred in the data storage device or the data storage system, and may further trigger the corresponding repairing procedure, for example but not limited to, powering off and then powering on (for example, rebooting) the device, or resetting the device.

Step S624: Error recovery successful.

As described above, in the proposed method for performing error recovery, the probability of successful line reset operation is increased by performing the operation of periodic line reset, and the restoration of normal access operation of the data storage device in the error recovery procedure, such as restoring the transmission rate to the predetermined transmission rate that is being used by the data storage device or the data storage system when the error occurred to avoid the determination or the occurrence of the fatal error and to further improve the access performance of the data storage device 100, is more effective as compared to the prior art designs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data storage device, comprising:
an interface circuit, configured to process reception signals received from a peer device and transmission signals to be transmitted to the peer device, wherein the interface circuit comprises a signal processing circuit configured to perform an error recovery procedure when an error has occurred in the data storage device, and
when performing the error recovery procedure, the signal processing circuit selectively performs a periodic line reset operation or an one-shot line reset operation according to a device identifier,
when the device identifier satisfies a predetermined condition, the signal processing circuit performs the periodic line reset operation to repeatedly transmit a line reset signal to the peer device in a predetermined period until the predetermined period expires or another line reset signal representing an acknowledgment of the line reset signal is received from the peer device, and
when the device identifier does not satisfy the predetermined condition, the signal processing circuit performs the one shot line reset operation to transmit the line reset signal to the peer device for only one time.

2. The data storage device of claim 1, wherein when determining that a first signal handshake procedure has failed, the signal processing circuit determines to perform the operation of line reset, and wherein the signal processing circuit tries to trigger the first signal handshake procedure by transmitting a first predetermined request signal to the peer device for at least one time.

3. The data storage device of claim 2, wherein the signal processing circuit requests to reset a current transmission rate in the first signal handshake procedure.

4. The data storage device of claim 2, wherein in the first signal handshake procedure, the signal processing circuit requests to maintain a current transmission rate at a predetermined transmission rate that is being used by the data storage device when the error occurred.

5. The data storage device of claim 2, wherein the first predetermined request signal is a power mode change request signal defined by the Mobile Industry Processor Interface (MIPI) alliance.

6. The data storage device of claim 1, wherein the signal processing circuit transmits the line reset signal to the peer device by setting voltages on a pair of differential signal transmission paths based on a specific pattern.

7. The data storage device of claim 1, wherein the data storage device is comprised in a data storage system, and the peer device is a host device accessing the data storage device in the data storage system.

8. The data storage device of claim 1, wherein in the periodic line reset operation, when the signal processing circuit has not received any line reset signal from the peer device when the predetermined period expires, the signal processing circuit determines that error recovery has failed, and when the signal processing circuit has received said another line reset signal from the peer device before the predetermined period expires, the signal processing circuit further transmits a second predetermined request signal to trigger a second signal handshake procedure.

9. The data storage device of claim 8, wherein when determining that the second signal handshake procedure has failed, the signal processing circuit determines that the error recovery has failed, and when determining that the second signal handshake procedure is successful, the signal processing circuit determines that the error recovery is successful.

10. The data storage device of claim 8, wherein the signal processing circuit sets a current transmission rate to a lowest transmission rate to transmit the second predetermined request signal, and requests to restore the current transmission rate to a predetermined transmission rate that is being used by the data storage device when the error occurred in the second signal handshake procedure.

11. A method for performing error recovery, applied in an error recovery procedure performed by a signal processing circuit when an error has occurred in a data storage device, comprising:
   transmitting a first predetermined request signal to a peer device to try to trigger a first signal handshake procedure;
   selectively performing a periodic line reset operation or an one-shot line reset operation according to a device identifier when determining that the first signal handshake procedure has failed;
   performing the periodic line reset operation to repeatedly transmit a line reset signal to the peer device when the device identifier satisfies a predetermined condition; and
   performing the one-shot line reset operation to transmit the line reset signal to the peer device for only one time when the device identifier does not satisfy the predetermined condition.

12. The method of claim 11, further comprising:
   requesting to reset a current transmission rate in the first signal handshake procedure.

13. The method of claim 11, further comprising:
   requesting to maintain a current transmission rate at a predetermined transmission rate that is being used by the data storage device when the error occurred in the first signal handshake procedure.

14. The method of claim 11, wherein the first predetermined request signal is a power mode change request signal defined by the Mobile Industry Processor Interface (MIPI) alliance.

15. The method of claim 11, wherein the line reset signal is transmitted by setting voltages on a pair of differential signal transmission paths based on a specific pattern.

16. The method of claim 11, wherein the signal processing circuit is comprised in an interface circuit of the data storage device.

17. The method of claim 11, wherein when performing the periodic line reset operation, the method further comprises:
   determining that the error recovery has failed when the line reset signal is determined to have not been received by the peer device, wherein when the signal processing circuit has not received any line reset signal from the peer device when the predetermined period expires, the line reset signal is determined to have not been received by the peer device; and
   transmitting a second predetermined request signal to trigger a second signal handshake procedure when the line reset signal is determined to have been received by the peer device.

18. The method of claim 17, further comprising:
   determining that the error recovery has failed when the second signal handshake procedure is determined to have failed; and
   determining that the error recovery is successful when the second signal handshake procedure is determined successful.

19. The method of claim 17, wherein the second predetermined request signal is transmitted at a current transmission rate which is set to a lowest transmission rate, and in the second signal handshake procedure, the current transmission rate is requested to be restored to a predetermined transmission rate that is being used by the data storage device when the error occurred.

* * * * *